(12) United States Patent
Gan et al.

(10) Patent No.: US 9,648,548 B1
(45) Date of Patent: May 9, 2017

(54) WIFI MESH CONFIGURATION

(71) Applicant: Sprint Spectrum LP, Overland Park, KS (US)

(72) Inventors: Seng Gan, Ashburn, VA (US); Khoi Nguyen, Lenexa, KS (US); Aaron Hinkle, Centreville, VA (US); Michael F. Fiumano, McLean, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 140 days.

(21) Appl. No.: 14/588,573

(22) Filed: Jan. 2, 2015

(51) Int. Cl.
| | |
|---|---|
| H04L 12/28 | (2006.01) |
| H04L 29/06 | (2006.01) |
| H04L 12/24 | (2006.01) |
| H04W 88/08 | (2009.01) |
| H04W 76/02 | (2009.01) |
| H04W 84/10 | (2009.01) |
| H04W 48/10 | (2009.01) |
| H04L 29/12 | (2006.01) |
| H04W 48/16 | (2009.01) |
| H04L 12/733 | (2013.01) |
| H04L 29/08 | (2006.01) |
| H04W 84/22 | (2009.01) |

(52) U.S. Cl.
CPC ......... *H04W 48/10* (2013.01); *H04L 41/0806* (2013.01); *H04L 45/122* (2013.01); *H04L 61/2007* (2013.01); *H04L 67/12* (2013.01); *H04W 48/16* (2013.01); *H04W 84/22* (2013.01)

(58) Field of Classification Search
CPC .......................................... H04W 88/08–88/10
See application file for complete search history.

(56) References Cited

U.S. PATENT DOCUMENTS

| | | | |
|---|---|---|---|
| 7,352,734 B2* | 4/2008 | Zaitsu ................ | G06Q 30/0603 370/338 |
| 8,037,305 B2* | 10/2011 | Rahman ................ | H04L 63/162 380/270 |
| 8,107,414 B2 | 1/2012 | Wang et al. | |
| 2005/0078624 A1* | 4/2005 | Shu ........................ | H04W 24/02 370/328 |
| 2010/0309815 A1* | 12/2010 | Yepez ................. | H04L 12/4625 370/254 |
| 2014/0304770 A1* | 10/2014 | Jung ..................... | H04W 12/12 726/2 |
| 2016/0100440 A1* | 4/2016 | Emord ................ | H04W 76/021 370/329 |

* cited by examiner

*Primary Examiner* — Wutchung Chu

(57) ABSTRACT

A wireless mesh network is configured. Each node is configured to function as either a gateway node or a relay node. To configure itself as a gateway node, an access node selects an SSID for each of its wireless interfaces that indicates it is an access node. When a relay access node is configuring itself, it scans for the SSIDs of available networks. The SSIDs of the mesh network are selected to indicate the number of other access points between a given access node and a direct wired connection (which is zero in the case of a gateway node.) The relay access node connects to the network having an SSID that indicates the fewest number of hops between itself and a direct wired connection. The SSID that is broadcast by the relay access node indicates the number of other access points between itself and a direct wired connection.

19 Claims, 6 Drawing Sheets

WIFI MESH CONFIGURATION

TECHNICAL BACKGROUND

Wireless communication can be used as a means of accessing a communication network. Wireless communication has certain advantages over wired communications for accessing a network. For example, implementing a wireless interface can eliminate a need for a wired infrastructure, thereby reducing the cost of building and maintaining network infrastructure. As the use wireless communication gains in popularity, network operators are seeking technically efficient and cost effective methods for providing reliable wireless services to their users.

In order to meet increasing network demands associated with wireless communications, small cells may be deployed in many areas where wired backhaul connections are unavailable, or expensive. One method of providing economical backhaul links between a core network, (or backbone network) and the access nodes at the 'edge' of a wireless network is to form a mesh network to carry backhaul traffic.

OVERVIEW

In an embodiment, a method of operating a communication system includes establishing, by an access node, a direct wired link to a communication network. This access node includes at least one wireless network interface. At least one wireless network interface is configured into access point mode. The at least one wireless network interface is configured to broadcast a service set identifier (SSID) that indicates the access node has a direct wired link to the communication network.

In an embodiment, a method of operating a communication system includes scanning for a plurality of available wireless networks by a relay access node. The relay access node receives a first service set identifier (SSID) from a first access node. The first SSID indicates the number of wireless hops between the first access node and a direct wired link to a communication network. The relay access node establishes a wireless client link between the relay access node and the first access node.

In an embodiment, a communication system includes a first access node and a second access node. The first access node includes a wired network interface and a first wireless network interface. The first access node having a direct wired link to a communication network. The first access node configures its first wireless network interface into access point mode. The first access node broadcasts, via the first wireless network interface, a first service set identifier (SSID) that indicates the first access node has a direct wired link to the communication network. The second access node includes a second wireless network interface and a third wireless network interface. The second access node scans for a plurality of available wireless networks. The second access node receives the first SSID from the first access node. The second access node, based on the SSID that indicates the first access node has a direct wired link to the communication network, establishes a first wireless client link between the first access node and the second access node.

DETAILED DESCRIPTION

In an embodiment, a wireless mesh network is configured using a set of access nodes. Each access node is configured to function as either a gateway node or a relay node. Gateway nodes have direct wired connections to the wired network. Each access node configures itself. If the access node has a direct wired connection, it configures itself as a gateway node. To configure itself as a gateway node, an access node selects an SSID for each of its wireless interfaces that indicates it is a gateway node.

When a relay access node is configuring itself, it scans for the SSIDs of available networks. The SSIDs of the mesh network are selected to indicate the number of other access points between a given access node and a direct wired connection (which is zero in the case of a gateway node.) The relay access node connects to the network having an SSID that indicates the fewest number of hops between itself and a direct wired connection. The relay access node then configures the rest of its wireless interfaces in access point mode. The SSID that is broadcast by the relay access node indicates the number of other access points between itself and a direct wired connection (i.e., the number of hops associated with the node it just connected to, plus 1.)

Figure 1:
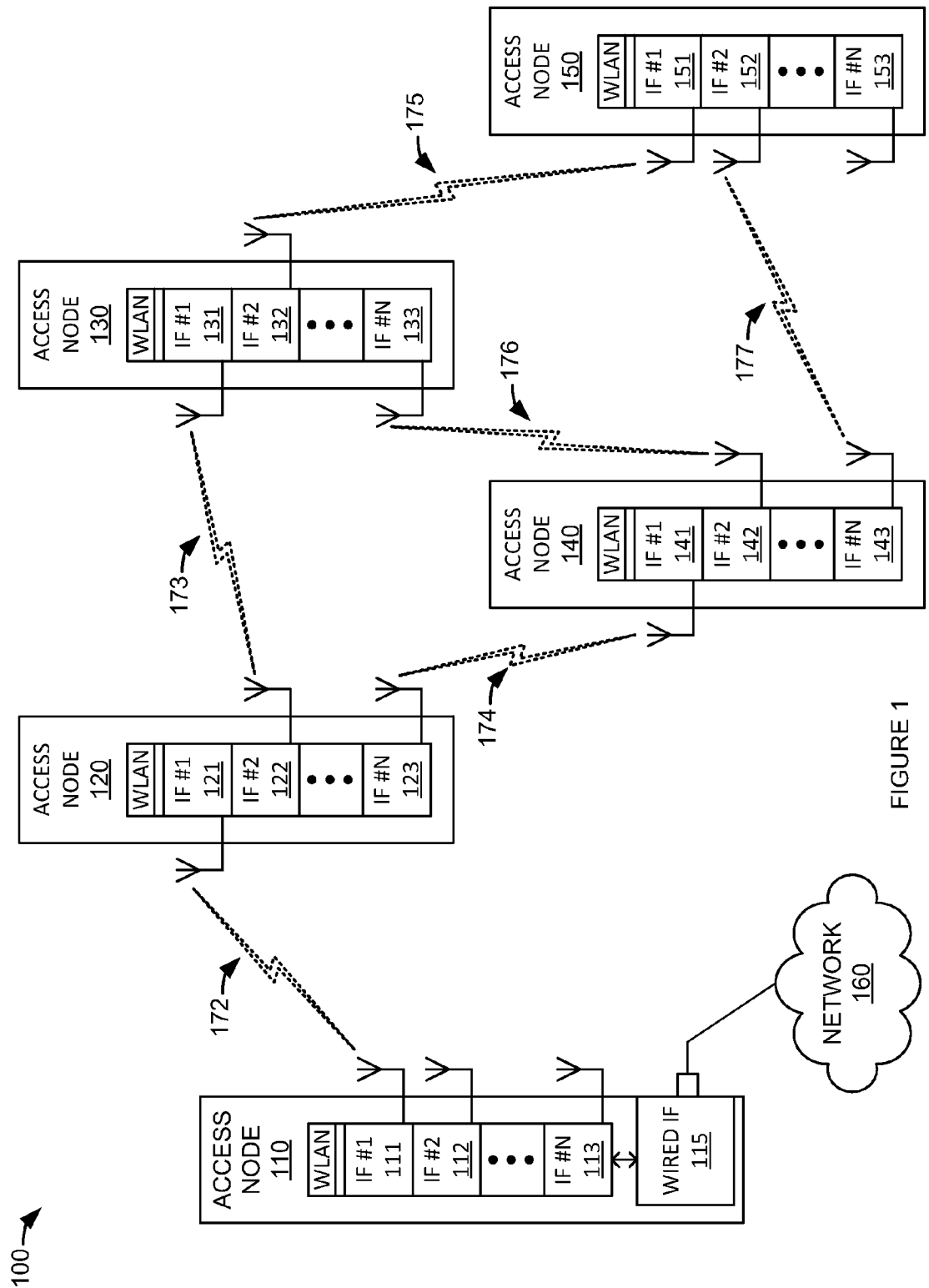
FIG. 1 is a block diagram of a communication system.

FIG. 1 is a block diagram of a communication system. In FIG. 1, communication system 100 comprises access node 110, access node 120, access node 130, access node 140, access node 150, and network 160. Access node 110 includes wired interface 115, and an arbitrary number of wireless interfaces. These wireless interfaces are illustrated in FIG. 1 as interface #1 111, wireless interface #2 112, and wireless interface #N 113. Access node 120 includes an arbitrary number of wireless interfaces. These wireless interfaces are illustrated in FIG. 1 as wireless interface #1 121, wireless interface #2 122, and wireless interface #N 123. Access node 130 includes an arbitrary number of wireless interfaces. These wireless interfaces are illustrated in FIG. 1 as wireless interface #1 131, wireless interface #2 132, and wireless interface #N 133. Access node 140 includes an arbitrary number of wireless interfaces. These wireless interfaces are illustrated in FIG. 1 as wireless interface #1 141, wireless interface #2 142, and wireless interface #N 143. Access node 150 includes an arbitrary number of wireless interfaces. These wireless interfaces are illustrated in FIG. 1 as wireless interface #1 151, wireless interface #2 152, and wireless interface #N 153.

It should be understood that the N-number of wireless interfaces illustrated in each of the access nodes 110, 120, 130, 140, and 150 in FIG. 1 is merely for illustration purposes. Each of access node 110, access node 120, access node 130, access node 140, and access node 150 may have the same or different numbers of wireless interfaces. Likewise, each of access node 120, access node 130, access node 140, and access node 150 may have one or more wired interfaces (not shown in FIG. 1.)

Network 160 is directly connected to access node 110 via wired interface 115. Wireless interface 111 of access node 110 is operatively coupled to access wireless interface 121 of access node 120 via wireless link 172. Wireless interface 122 of access node 120 is operatively coupled to wireless interface 131 of access node 130 via wireless link 173. Wireless interface 123 of access node 120 is operatively coupled to wireless interface 141 of access node 140 via wireless link 174. Wireless interface 132 of access node 130 is operatively coupled to wireless interface 151 of access node 150 via wireless link 175. Wireless interface 143 of access node 140 is operatively coupled to wireless interface 152 of access node 150 via wireless link 177.

Access nodes 110, 120, 130, 140, and 150 are network nodes capable of providing wireless communication to wireless devices (not shown in FIG. 1) and to each other. Access nodes 110, 120, 130, 140, and 150 can be, for example, one or more of a WiFi access node, a WiFi hotspot, a WiFi gateway, a base transceiver station, a radio base station, an eNodeB device, or an enhanced eNodeB device. Access node 110 is directly connected to network 160.

Network 160 is a wide area communication network that can provide wired communication to access node 110. Communication system 100 and can comprise wired and/or wireless communication networks that include processing nodes, routers, gateways, physical and/or wireless data links for carrying data among various network elements, including combinations thereof, and can include a local area network, a wide area network, and an internetwork (including the Internet). Network 160 can also comprise wireless networks, including base station, wireless communication nodes, telephony switches, internet routers, network gateways, computer systems, communication links, or some other type of communication equipment, and combinations thereof.

Wired network protocols that may be utilized by network 160 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 may comprise one or more IEEE 802.11 specified protocols, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Links between elements of network 160, can be, for example, twisted pair cable, coaxial cable or fiber optic cable, or combinations thereof.

Other network elements may be present in network 160 to facilitate communication to/from access nodes 110, 120, 130, 140, and 150 but are omitted for clarity, such as base stations, base station controllers, gateways, mobile switching centers, dispatch application processors, and location registers such as a home location register or visitor location register. Furthermore, other network elements may be present to facilitate communication between among elements of communication system 100 which are omitted for clarity, including additional processing nodes, routers, gateways, and physical and/or wireless data links for carrying data among the various network elements.

Access node 110 has a direct wired link to network 160. This direct wired connection establishes access node 110 as a gateway node to the wireless mesh formed by access nodes access nodes 110, 120, 130, 140, and 150. Access node 110 configures its wireless interfaces 111-113 into access point mode. Access node 110 configures itself to broadcast a service set identifier (SSID) from at least one of the wireless interfaces. The SSID selected by access node 110 indicates that access node 110 (and therefore wireless interfaces 111-113) has a direct wired link to a wired communication network.

For example, access node 110 may broadcast an SSID (via wireless interfaces 111-113) that is comprised of multiple fields. At least one of these fields may indicate that access node 110 is a gateway node (i.e., has a direct wired connection to network 160.) For example, access node 110 may broadcast an SSID that has the fields "XX_YY_MMM-MMM" where XX is a network identification indicator (e.g., 'NET' or 'MYMESH'); the number 'YY' indicates the number of wireless links between access node 110 and network 160 (thus, for a direct connection YY=00 indicating that access node 110 is directly connected to network 160); and 'MMMMMM' is an unique portion of a medium access control (MAC) number associated with access node 110 (e.g., the 24 least significant bits of the MAC address of the lowest numerical MAC address of any of interfaces 111-113 and/or 115.) The unique portion of the MAC number associated with the access node does not include a manufacturer identification field.

Access node 120 does not have a direct wired link to network 160. To configure itself, access node 120 uses wireless interfaces 121-123 to scan for available wireless networks. After access node 110 has configured itself and is broadcasting an SSID that indicates access node 110 is directly connected to network 160, access node 120 may receive access node 110's SSID. Based on the number '00' in the YY field of the SSID broadcast by access node 110, access node 120 knows that access node 110 has a direct wired link to network 160. Based on this indication that access node 110 has a direct wired link to network 160, access node 120 establishes a wireless client link (e.g., wireless link 172) to access node 110 using wireless interface 121.

After establishing a wireless client link (e.g., wireless link 172) to access node 110, access node 120 configures its remaining wireless interfaces (e.g., wireless interfaces 122-123) into access point mode. Access node 120 then configures itself to broadcast an SSID from at least one of the wireless interfaces that are in access point mode. The SSID selected by access node 110 can indicate that access node 120 (and therefore wireless interfaces 122-123) does not have a direct wired link to a wired communication network. The SSID selected by access node 110 can indicate the number of wireless links between access node 120 (and therefore wireless interfaces 121-123) and a direct wired link to a wired communication network.

For example, access node 120 may broadcast an SSID (via wireless interfaces 121-123) that is comprised of multiple fields which correspond to the multiple fields broadcast by access node 110. At least one of these fields may indicate that access node 120 is a relay node (i.e., does not have a direct wired connection to network 160.)

For example, access node 120 may broadcast an SSID that has the same fields as access node 110: "XX_YY_MMM-MMM" where XX is a network identification indicator (e.g., 'NET' or 'MYMESH'); the number 'YY' indicates the number of wireless links between access node 120 and network 160 (thus, for a the single wireless link 172 between access node 120 and network 160, YY=01 indicating that access node 120 has one wireless 'hop' to network 160); and 'MMMMMM' is an unique portion of a MAC number associated with access node 120 (e.g., the 24 least significant bits of the MAC address of the lowest numerical MAC address of any of interfaces 121-123.)

Access node 130 does not have a direct wired link to network 160. Further, access node 130 is unable (e.g., because it is too far away) to receive the SSID broadcast by access node 110. However, access node 130 can receive the SSID broadcast by access node 120. To configure itself, access node 130 uses wireless interfaces 131-133 to scan for available wireless networks. After access node 120 has configured itself, access node 130 may receive access node 120's SSID. Based on the number '01' in the YY field of the SSID broadcast by access node 110, access node 120 knows the number of wireless link between itself and network 160.

After establishing a wireless client link (e.g., wireless link 173) to access node 120, access node 130 configures its remaining wireless interfaces (e.g., wireless interfaces 132-133) into access point mode. Access node 130 then configures itself to broadcast an SSID from at least one of the wireless interfaces 132-133 in access point mode. The SSID selected by access node 130 can indicate that access node 120 (and therefore wireless interfaces 132-133) does not have a direct wired link to a wired communication network. The SSID selected by access node 130 can indicate the number of wireless links between access node 130 (and therefore wireless interfaces 131-133) and a direct wired link to a wired communication network.

For example, access node 130 may broadcast an SSID (via wireless interfaces 131-133) that is comprised of multiple fields which correspond to the multiple fields broadcast by access node 110 and access node 120. At least one of these fields may indicate that access node 130 is a relay node (i.e., does not have a direct wired connection to network 160.)

For example, access node 130 may broadcast an SSID that has the same fields as access node 110: "XX_YY_MMM-MMM" where XX is a network identification indicator (e.g., 'NET' or 'MYMESH'); the number 'YY' indicates the number of wireless links between access node 130 and network 160 (thus, for the two wireless links 172 and 173 between access node 130 and network 160, YY=02 indicating that access node 120 has two wireless hops to network 160); and 'MMMMMM' is an unique portion of a MAC number associated with access node 130 (e.g., the 24 least significant bits of the MAC address of the lowest numerical MAC address of any of interfaces 131-133.)

Access node 140 does not have a direct wired link to network 160. However, access node 140 is able (e.g., because it is in between access node 120 and access node 130) to receive the SSIDs broadcast by both access node 120 and access node 130.

To configure itself, access node 140 uses wireless interfaces 141-143 to scan for available wireless networks. After access node 120 and access node 130 have configured themselves, access node 140 may receive the SSIDs broadcast by access node 120 and access node 130, respectively. Based on a comparison of the numbers in the YY field of the SSIDs broadcast by access node 120 and access node 130, access node 140 can determine which of access node 120 and access node 130 has the least number of wireless links between access node 140 and network 160. Thus, based on the number '01' in the YY field of the SSID broadcast by access node 120, and the number '02' in the YY field of the SSID broadcast by access node 130, access node 140 elects to establish a wireless client link (e.g., wireless link 174) to access node 120 using wireless interface 141 because it has fewer 'hops' to network 160. Access node 140 may then configure itself to broadcast an SSID indicating the number '02' in the YY field.

Access node 150 does not have a direct wired link to network 160. However, access node 150 is able (e.g., because it is in between access node 130 and access node 140) to receive the SSIDs broadcast by both access node 130 and access node 140.

To configure itself, access node 150 uses wireless interfaces 151-153 to scan for available wireless networks. After access node 130 and access node 140 have configured themselves, access node 150 may receive the SSIDs broadcast by access node 130 and access node 140, respectively. Based on a comparison of the numbers in the YY field of the SSIDs broadcast by access node 130 and access node 140, access node 150 can determine that access node 130 and access node 140 have the same number (i.e., 2) of wireless links between themselves and network 160. Thus, access node 150 may use other information to determine which of access node 130 or access node 140 to establish a wireless client link with. This additional information may also be indicated by a field in the SSID broadcast by access node 130 and access node 140. For example, the SSIDs broadcast by access nodes 110, 120, 130, 140, and 150 may include delay or throughput (i.e., bit rate) information.

In an embodiment, access node 110 (which is a gateway node) can configure itself as follows: (i) access node 110 blocks wireless interfaces 111-113 from wired interface 115; (ii) wired interface 115 is connected to network 160; (iii) access node configures wireless interfaces 111-113 in access point mode and broadcasting an SSID with the fields "XX_00_MMMMMM", where XX is an identifier of the mesh network being configured, 00 indicates access node 110 is a gateway node, and MMMMMM is a unique identifier associated with access node 110; (iv) wireless interfaces 111-113 and wired interface 115 are unblocked from each other; (v) small cell ports (not shown in FIG. 1) may be enabled to communicate with network 160.

In an embodiment, access nodes 120, 130, 140, and 150 (which are relay nodes) can configure themselves as follows (using access node 120 as an example): (i) since no wired connection is present, any wired interfaces (not shown in FIG. 1) are blocked; (ii) the wireless interfaces 121-123 are configured into client mode and scan for an SSID with the fields "XX_YY_MMMMMM"; (iii) if multiple SSIDs with matching "XX" fields (and the correct format) are detected, access node 120 will connect to the SSID that is the lowest numerically (note: this ensures access node 120 is connecting to the available access node with the fewest number of hops to a gateway node); (iv) the remaining wireless interfaces are configured into access point mode; (v) access node 120 broadcasts an SSID that is "XX_ZZ_PPPPPP" where ZZ=XX+1, and PPPPPP is the lowest MAC address of access node 120; (vi) small cell ports (not shown in FIG. 1) may be enabled to communicate with network 160; (vii) other access nodes can optionally connect to access node 120.

This self-configuration and discovery process can repeat itself for access nodes 130, 140, and 150 to form a mesh network. The small cells connected to any of access nodes 110, 120, 130, 140, and/or 150 can use this mesh network to communicate with network 160.

Figure 2:
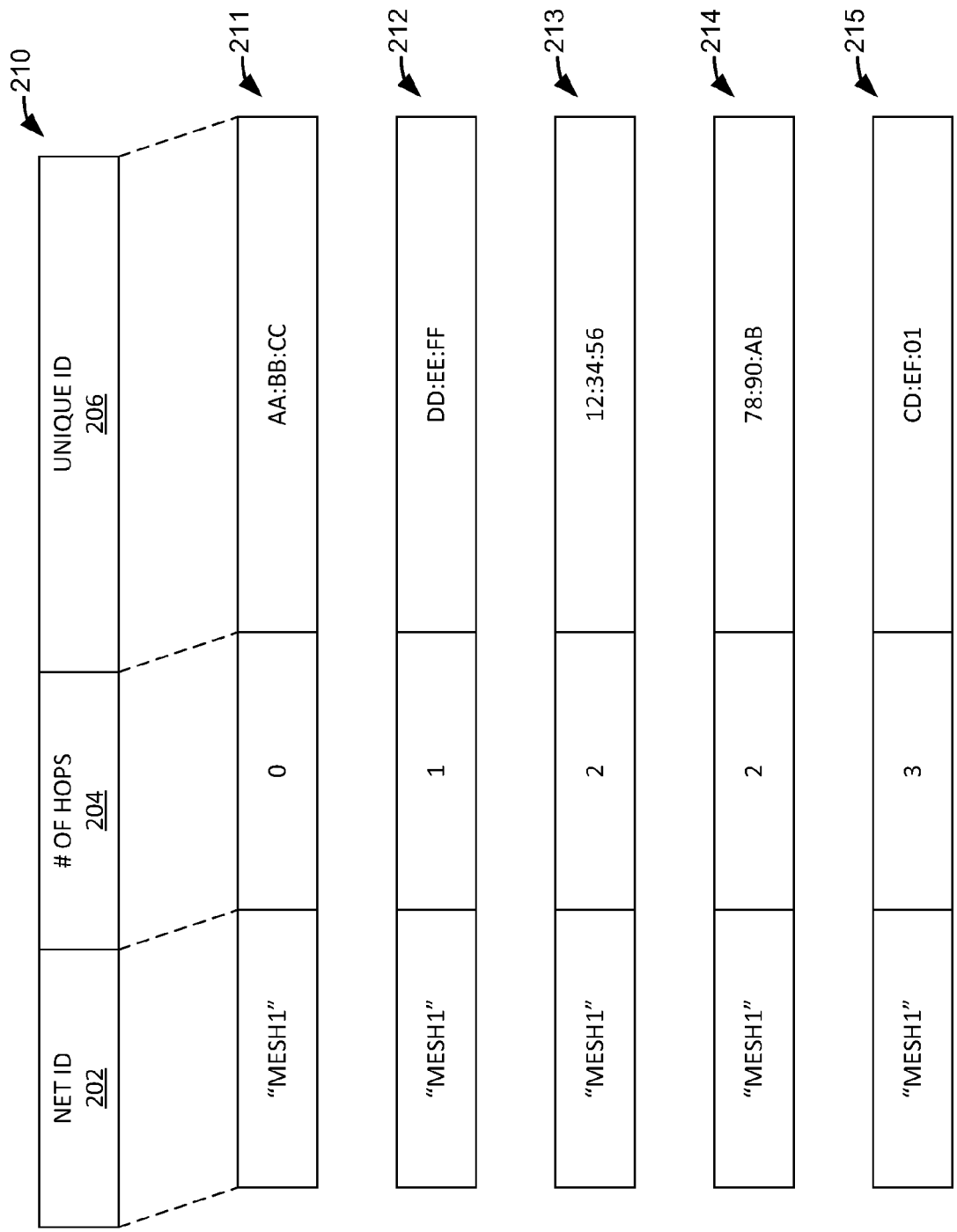
FIG. 2 is an illustration of SSID fields.

FIG. 2 is an illustration of SSID fields. The SSID fields illustrated in FIG. 2 may be used by one or more elements of communication system 100. In FIG. 2, the format of an example SSID field suitable for use with communication system 100 is given by 210. SSID format 210 includes a mesh network identifier field 202, a number of hops field 204 that indicates the number of wireless links from the access node broadcasting the SSID to a wired network, and a unique identifier field 206. SSID 211 illustrates an example SSID that may be broadcast by a gateway node (e.g., access node 110). SSID 211 has a network identifier of "MESH1", a number of hops of zero (0), and a unique identifier of AA:BB:CC. SSID 212 illustrates an example SSID that may be broadcast by a relay node (e.g., access node 120) that has one (1) wireless link hop to a wired network connection. SSID 212 has a network identifier of "MESH1", a number of hops of one (1), and a unique identifier of DD:EE:FF. SSID 213 illustrates an example SSID that may be broadcast by a relay node (e.g., access node 130) that has two (2) wireless link hops to a wired network connection. SSID 213 has a network identifier of "MESH1", a number of hops of two (2), and a unique identifier of 12:34:56. SSID 214 illustrates an example SSID that may be broadcast by a relay node (e.g., access node 140) that also has two (2) wireless link hops to a wired network connection. SSID 214 has a network identifier of "MESH1", a number of hops of two (2), and a unique identifier of 78:90:AB. SSID 215 illustrates an example SSID that may be broadcast by a relay node (e.g., access node 150) that has three (3) wireless link hops to a wired network connection. SSID 215 has a network identifier of "MESH1", a number of hops of three (3), and a unique identifier of CD:EF:01.

Figure 3:
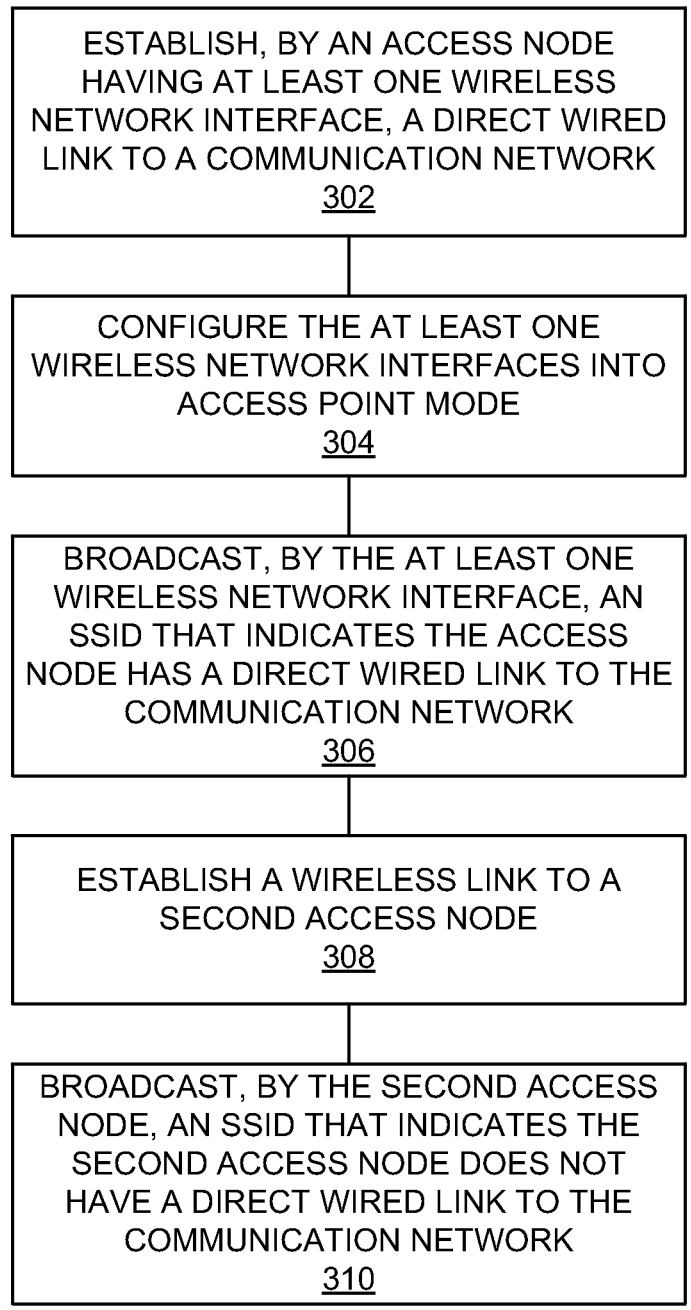
FIG. 3 is a flowchart illustrating a method of operating a communication system.

FIG. 3 is a flowchart illustrating a method of operating a communication system. The steps illustrated in FIG. 3 may be performed by one or more elements of communication system 100. By an access node having at least one wireless interface, a direct wired link is established to a communication network (302). For example, access node 110 (which has wireless interface 111) can establish a direct wired link to network 160 via wired interface 115.

The at least one wireless network interface is configured into access point mode (304). For example, access node 110 can configure wireless interface 111 into access point mode. By the at least one wireless network interface, an SSID that indicates the access node has a direct wired link to the communication is broadcast (306). For example, wireless interface 111 can broadcast and SSID that indicates the number of wireless hops between access node 110 and network 160 is zero. This indicator may be given in a field of the SSID.

A wireless link to a second access node is established (308). For example, access node 120 may elect to establish wireless link 172 with access node 110 based on the SSID broadcast by wireless interface 111 that indicates the number of wireless hops between access node 110 and network 160 is zero.

An SSID that indicates the second access node does not have a direct wired link to the communication network is broadcast by the second access node (310). For example, access node 120 may broadcast, from wireless interface 121, an SSID that indicates that there is one wireless hop between access node 120 and network 160.

Figure 4:
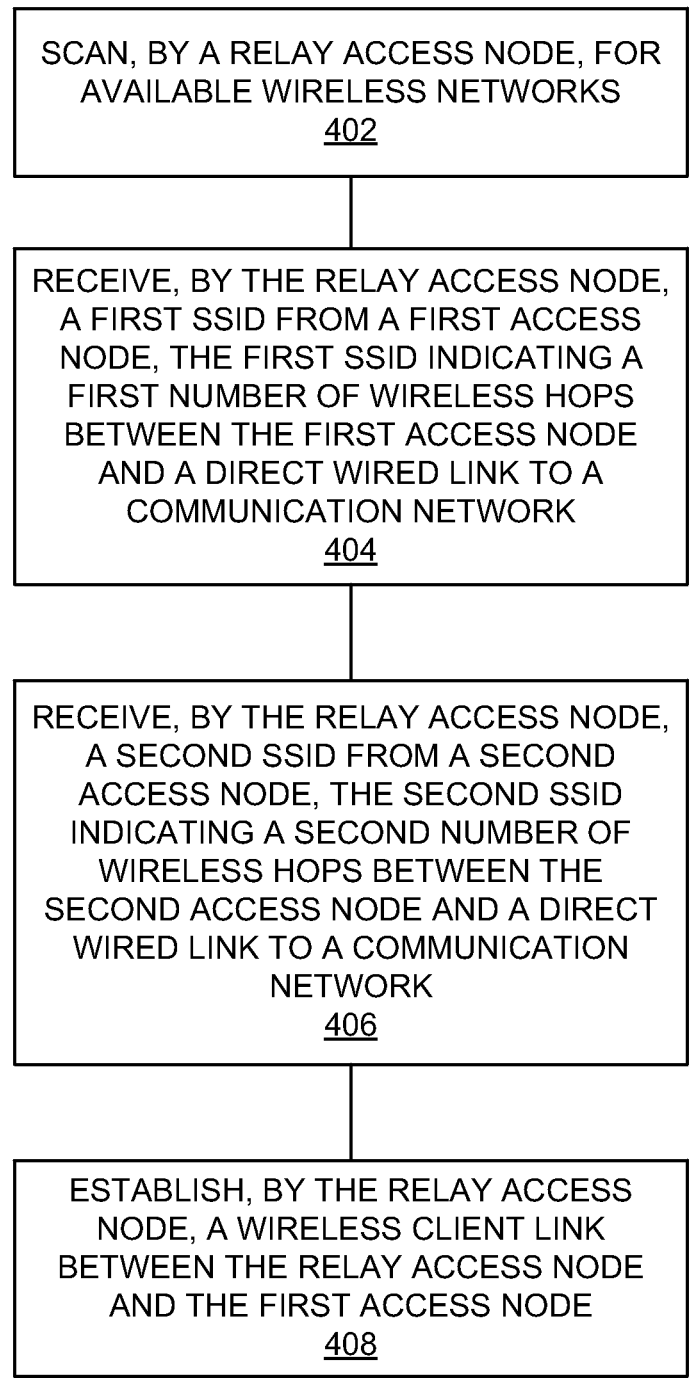
FIG. 4 is a flowchart illustrating a method of operating a relay access node.

FIG. 4 is a flowchart illustrating a method of operating a relay access node. The steps illustrated in FIG. 4 may be performed by one or more elements of communication system 100. By a relay access node, available wireless networks are scanned for (402). For example, access node 140 may scan for available wireless networks using wireless interface 141 and wireless interface 142.

By the relay access node, a first SSID is received from a first access node that indicates a first number of wireless hops between the first access node and a direct wired link to a communication network. For example, access node 140 may receive an SSID from access node 120 that indicates access node 120 is one wireless hop from a direct wired connection to network 160. By the relay access node, a second SSID is received from a second access node that indicates a second number of wireless hops between the second access node and a direct wired link to a communication network. For example, access node 140 may receive an SSID from access node 130 that indicates access node 130 is two wireless hops from a direct wired connection to network 160.

By the relay access node, a wireless client link is established between the relay access node and the first access node (408). For example, in response to a connection request from access node 140, access node 120 may establish wireless client link 174 with access node 140. Access node 140 may have elected to request a connection from access node 120 based on the SSID is received from access node 120 that indicates the number of wireless hops (i.e., 1) between the first access node and a direct wired link to a communication network. Access node 140 may have elected to request a connection from access node 120 based on the SSID is received from access node 120 that indicates the number of wireless hops (i.e., 1) between the access node 120 and network 160 is less than the number of hops (i.e., 2) indicated by the SSID received from access node 130.

Figure 5:
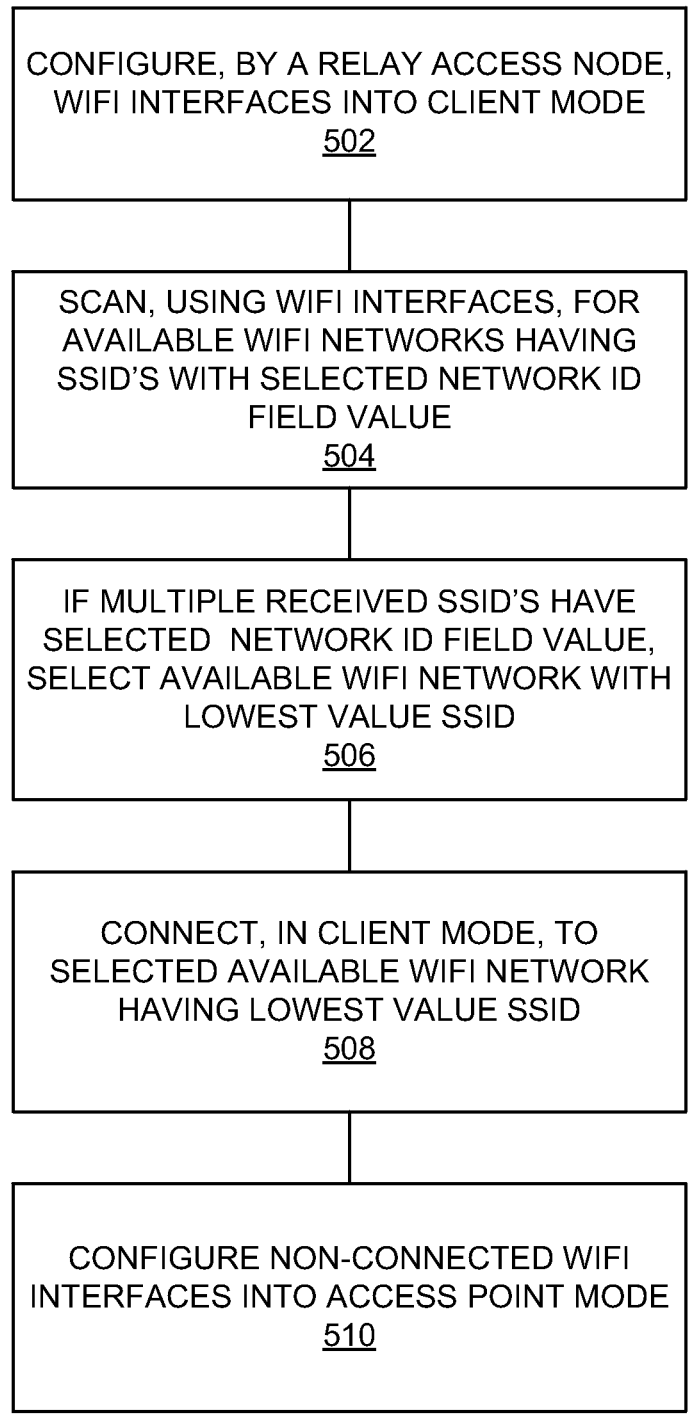
FIG. 5 is a flowchart illustrating a method of configuring an access node.

FIG. 5 is a flowchart illustrating a method of configuring an access node. The steps illustrated in FIG. 5 may be performed by one or more elements of communication system 100. By a relay access node, WiFi interfaces are configured into client mode (502). For example, access node 140 may configure wireless interfaces 141-143 into client mode.

Using the WiFi interfaces, available WiFi networks are scanned for that have SSID's with a selected network identification field value (504). For example, access node 140 may scan for available WiFi networks broadcasting an SSID value that has network ID field matching the network ID field access node 140 will broadcast (e.g., "MESH1".)

If multiple received SSID's had the selected network ID field value, the available WiFi network with the lowest value SSID is selected (506). For example, if access node 140 receives an SSID value from access node 120 of "MESH1_00_AA:BB:CC" and also receives an SSID value from access node 130 of "MESH1_01_DD:EE:FF", access node 140 would select the available network with the SSID beginning with "MESH1_00" (because "MESH1_00" is numerically less than "MESH1_01".)

In client mode, the selected available WiFi network having the lowest value SSID is connected to (508). For example, since access node 140 selected the available network SSID beginning with "MESH1_00" over the available network with the SSID beginning with "MESH1_01", access node 140 would connect, in client mode, to access node 120. The non-connected WiFi interfaces are configured into access point mode (510). For example, the remaining WiFi interfaces 142-143 of access node 140 are configured into access point mode.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 120, 130, 140, and 150, and/or network 160.

Figure 6:
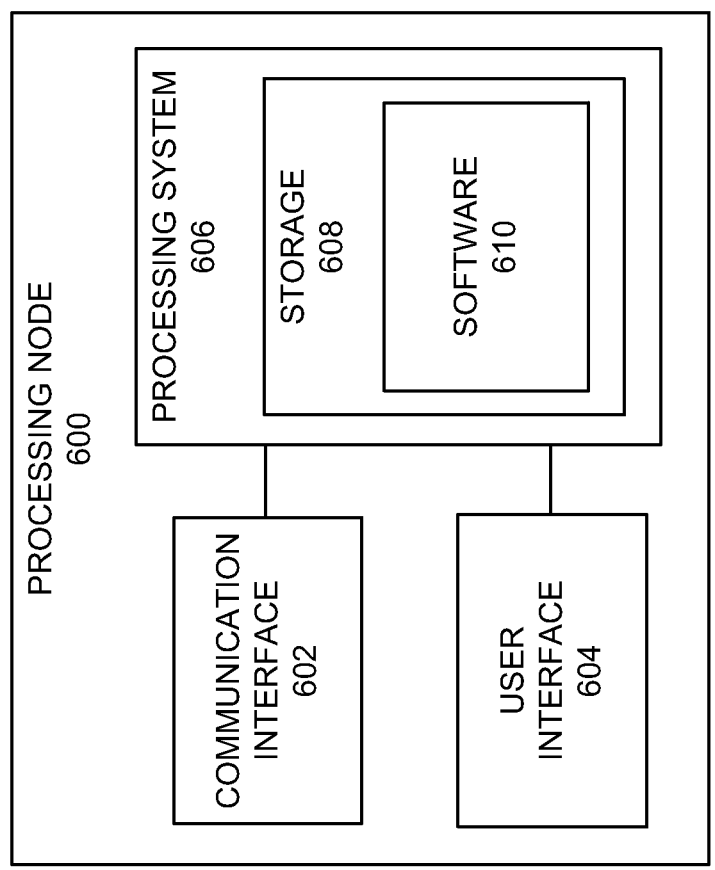
FIG. 6 illustrates a processing node.

FIG. 6 illustrates an exemplary processing node 600 comprising communication interface 602, user interface 604, and processing system 606 in communication with communication interface 602 and user interface 604. Processing node 600 is capable of paging a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

An example of processing node 600 includes access nodes 110, 120, 130, 140, and 150. Processing node 600 can also be an adjunct or component of a network element, such as an element of access nodes 110, 120, 130, 140, 150, and/or network 160, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
    establishing, by a first access node, a direct wired link to a communication network, the first access node including at least one wireless network interface;
    configuring the at least one wireless network interfaces into access point mode;
    broadcasting, by the at least one wireless network interfaces of the first access node, a service set identifier (SSID) that indicates the first access node has a direct wired link to the communication network; and
    establishing a wireless link to a second access node comprising a plurality of wireless network interfaces, wherein the wireless link is established with a first wireless network interface of the plurality of wireless network interfaces, and
    wherein the second access node configures a second wireless network interface of the plurality of wireless network interfaces into access point mode.

2. The method of claim 1, wherein the SSID includes a first field and a second field, the first field indicating the access node has a direct wired link to the communication network, the second field including a unique identifier.

3. The method of claim 2, wherein the unique identifier includes a portion of a media access control address assigned to one of the at least one wireless network interfaces.

4. The method of claim 3, wherein the portion of the media access control address does not include a manufacturer identification field.

5. The method of claim 3, further comprising:
    selecting the one of the at least one wireless network interfaces based on the media access control address assigned to the first one of the at least one wireless network interfaces.

6. The method of claim 5, wherein the SSID includes a third field, the third field identifying common identifier to identify a mesh network.

7. The method of claim 1, wherein the second access node broadcasts an SSID that indicates the second access node does not have a direct wired link to the communication network.

8. A method of operating a communication system, comprising:
    scanning, by a relay access node comprising a plurality of wireless network interfaces, for a plurality of available wireless networks;
    receiving, by the relay access node, a first service set identifier (SSID) from a first access node, the first SSID indicating a first number of wireless hops between the first access node and a direct wired link to a communication network;
    establishing, by the relay access node, a wireless client link between the relay access node and the first access node using a first wireless network interface of the plurality of wireless network interfaces; and
    configuring a second wireless interface of the plurality of wireless network interfaces in access point mode.

9. The method of claim 8, further comprising:
    receiving, by the relay access node, a second SSID from a second access node, the second SSID indicating a second number of wireless hops between the second access node and a direct wired link to a communication network.

10. The method of claim 9, wherein the first access node is selected for establishing the wireless client link based on the first number of wireless hops and the second number of wireless hops.

11. The method of claim 8, wherein the first wireless network interface is configured in client mode to establish the wireless client link.

12. The method of claim 8, further comprising:
broadcasting, by the relay access node, an SSID that indicates the relay access node has a greater number of wireless hops between the relay access node and the direct wired link to the communication network than the first number of wireless hops.

13. The method of claim 12, wherein the greater number of wireless hops indicates the first number of wireless hops plus one.

14. A communication system, comprising:
a first access node including a wired network interface and a first wireless network interface, the first access node having a direct wired link to a communication network, the first access node to configure the first wireless network interface into access point mode, and the first access node to broadcast via the first wireless network interface a first service set identifier (SSID) that indicates the first access node has a direct wired link to the communication network; and a second access node including a second wireless network interface and a third wireless network interface, the second access node to scan for a plurality of available wireless networks, the second access node to receive the first SSID from the first access node, the second access node to establish a first wireless client link between the first access node and the second access node using the second wireless network interface based on the first SSID that indicates the first access node has a direct wired link to the communication network, wherein the second access node configures the third wireless network interface into access point mode.

15. The communication system of claim 14, further comprising a third access node, the third access node to broadcast a third SSID, the third access node to establish a second wireless client link to the second access node based on a second SSID received from the second access node and a fourth SSID received from a fourth wireless access node, the second SSID indicating a first number of wireless hops between the second access node and the communication network, the fourth SSID indicating a second number of wireless hops between the fourth access node and the communication network.

16. The communication system of claim 15, wherein the first number indicates fewer wireless hops than the second number.

17. The communication system of claim 16, wherein the third access node is to select the third SSID based on the first number.

18. The communication system of claim 17, wherein the third SSID is selected to indicate the first number plus one wireless hop.

19. The communication system of claim 15, wherein the first SSID, the second SSID, the third SSID, and the fourth SSID are selected to be unique within said communication system based on MAC addresses of components of said first access node, said second access node, said third access node and said fourth access node.

* * * * *